United States Patent [19]

Winter et al.

[11] Patent Number: 4,789,164
[45] Date of Patent: Dec. 6, 1988

[54] SEALING DEVICE

[75] Inventors: Josef Winter, Rohrbach/Ilm; Rene Wagner, Bad Aibling; Klaus-Peter Goetze, Vaterstetten, all of Fed. Rep. of Germany

[73] Assignee: Raychem Corporation, Menlo Park, Calif.

[21] Appl. No.: 71,552

[22] Filed: Jul. 9, 1987

Related U.S. Application Data

[63] Continuation of Ser. No. 784,408, Oct. 14, 1985, abandoned.

[30] Foreign Application Priority Data

Oct. 25, 1984 [GB] United Kingdom ................ 8427046

[51] Int. Cl.⁴ .......................... F16L 5/02; F16J 15/02
[52] U.S. Cl. .................... 277/9; 174/152 G;
174/DIG. 8; 267/1.5; 277/26; 277/126;
277/138; 277/147; 285/338; 285/381
[58] Field of Search .................. 267/1.5; 277/138;
174/152 G

[56] References Cited

U.S. PATENT DOCUMENTS

| 316,188 | 4/1885 | Schnabl | 277/126 X |
|---|---|---|---|
| 814,289 | 3/1906 | Hawley | 277/128 X |
| 2,545,531 | 3/1951 | Sands | 277/138 X |
| 3,737,605 | 6/1973 | Tobey et al. | 277/212 FB X |
| 3,990,661 | 11/1976 | De Groef | 174/DIG. 8 |
| 4,177,376 | 12/1979 | Horsma et al. | 174/DIG. 8 |
| 4,194,750 | 3/1980 | Sovish et al. | 277/9 X |
| 4,237,609 | 12/1980 | Clabburn et al. | 174/DIG. 8 |
| 4,293,138 | 10/1981 | Swantee . | |
| 4,323,607 | 4/1982 | Nishimura et al. | 174/DIG. 8 |
| 4,422,890 | 12/1983 | Penneck | 174/DIG. 8 |
| 4,557,625 | 12/1985 | Jahnke et al. | 277/212 FB X |

FOREIGN PATENT DOCUMENTS

| 457780 | 3/1928 | Fed. Rep. of Germany | 277/126 |
|---|---|---|---|
| 3213414 | 10/1983 | Fed. Rep. of Germany . | |
| 3347885 | 5/1985 | Fed. Rep. of Germany . | |
| 2501926 | 9/1982 | France . | |
| 2140114 | 11/1984 | United Kingdom . | |
| 2171139 | 8/1986 | United Kingdom . | |

Primary Examiner—Allan N. Shoap
Attorney, Agent, or Firm—A. Stephen Zavell; Herbert G. Burkard

[57] ABSTRACT

A duct seal (1) especially for sealing about four cables, contains a spring (8) which when operated radially expands that part of the duct seal that is to seal to a wall etc (2). The cables are sealed by heat-shrink outlets (7) of the duct seal (1). The spring (8) is operated after heating the part of the duct seal in which it lies. Heating may soften the material of the seal and activate an adhesive (9).

1 Claim, 4 Drawing Sheets

PRIOR ART

SEALING DEVICE

This application is a continuation of application Ser. No. 784,408, filed Oct. 14, 1985, now abandoned.

FIELD OF THE INVENTION

The present invention relates to environmental sealing of substrates such as ducts or supply lines for example pipes or cables.

BACKGROUND OF THE INVENTION

Ducts and supply lines are often used in environments that are prone to contaminants such as moisture, dust, insects and gasses. Some form of seal therefore has to be provided either around the substrate (for example in the case of a supply line) or between two substrates (for example in the case of a duct seal between the duct and a supply line it carries).

Various techniques have been used in the past for forming such seals. The simplest perhaps is a tape wrap which has the advantage that a single product could be used over virtually any size or shape of substrate, but the disadvantage of poor performance. Sealing materials such as adhesives or mastics may be used alone or with tapes, but again performance is poor.

In recent years dimensionally-recoverable articles have been used for sealing supply lines and as duct seals. In general, a dimensionally-recoverable article is an article the dimensional configuration of which may be made substantially to change when subjected to a suitable treatment, for example heating. Usually these articles recover towards an original shape from which they have previously been deformed but the term also includes an article which adopts a new configuration even if it has not previously been deformed.

In their most common form such articles comprise a heat-shrinkable sleeve made from a polymeric material exhibiting the property of elastic or plastic memory as described, for example, in U.S. Pat. Nos. 2027962, 3086242 and 3597372. In the production of heat-recoverable articles, the polymeric material may be cross-linked at any stage in the production of the article that will enhance the desired dimensional recoverability.

An advantage of these articles is that they are strong, impermeable, water resistant and well able to resist such agencies as the small mechanical stresses caused by temperature variation, earth movements and repair work. They can be easily installed in their recoverable configuration and then caused to shrink (or otherwise recover) into sealing engagement with the substrate that they are to protect. In this way, ease of installation can be combined with excellent performance. A single size of product may be used with a variety of sizes of substrate, and close tolerances in manufacture may be avoided.

A difficulty, however, remains in some circumstances. The very fact that these articles recover on heating means that in general heat must be applied when the article is in approximately the desired position with respect to the substrate. This may be a problem where the substrate or some article nearby is a heat sink, where it physically prevents or hinders proper positioning of a torch or other heating means, where it is hazardous for example a gas pipe, or where it may be damaged by excessive heat.

SUMMARY OF THE INVENTION

We have now devised an article which either does not need to be heated or which can be heated away from the desired installed position, but which still benefits from the ease of installation and lack of need for close tolerances usually associated with heat-shrinkable products.

Thus, the invention provides a duct seal comprising:
a sealing member that can provide a seal between a duct and a substrate carried by the duct; and
a resilient member that can be operated after positioning of the sealing member in the duct to provide a resiliently biased engagement between the sealing member and the duct.

The invention also provides an article for sealing a substrate comprising:
a sealing member that can be deformed only when subjected to a certain treatment but is not deformed immediately solely by said treatment, said deformation being from a first configuration to a second configuration at which it is substantially unstressed and at which it engages the substrate; and
a mechanical member that can be deformed to correspond to said second configuration of the sealing member, thereby causing a resiliently biased engagement between the sealing member and the substrate.

We prefer that the treatment comprises heating. Thus, the sealing member can only be deformed when heated (which may for example soften the material from which it is made), but it will not immediately become deformed solely by heating. An alternative treatment is subjection to a solvent or other liquid, for example water, which may cause the material of the member to soften.

Reference to the sealing member being deformable only when subjected to said treatment is of course to be construed bearing in mind the usual meaning of terms of this art, and the problems solved by this invention. For the avoidance of doubt three points may be made. Firstly, any article is ultimately deformable, and we exclude deformation that would render the article useless. Secondly, the forces that should be considered are those normally encountered in the installation and use of such articles, since ability to install and resistance to displacement during proper use are relevant. Thirdly, the extents of deformation before and after treatment should be considered in relation to the change in configuration required for installation and the change is configuration acceptable after installation. It is believed that the skilled man will have no difficulty in interpreting the requirement regarding deformation.

The article may have, in addition to a first portion that sealingly engages the substrate, a second portion that sealingly engages another substrate or a different part of the same substrate. Thus, where the article comprises a duct seal a second portion may engage the inside of the duct and a first portion may engage a supply line or other substrate carried by the duct. The first and/or second portions may seal to the duct and/or supply line by any suitable means. For example each part may be recoverable, or provided with a mechanical fixing means (optionally the mechanical member referred to above) or provided with an adhesive or sealant, or a combination of these sealing techniques may be used. It can be seen therefore that the mechanical member which causes the resilient bias may act to help maintain a seal to the duct and/or to the supply line; we prefer, however, that the mechanical member acts to maintain an expanded portion of the duct seal against the inside of the duct, and that another portion of the duct seal is heat-shrunk into engagement with the supply line. No difficulty will generally be found in applying heat to shrink that other portion of the duct seal around the supply line because that other portion (unlike the portion which engages the duct) may protrude from the duct.

The article of the invention may be used in other situations, for example it may provide encapsulation around a supply line, including joints in supply lines. Here the sealing member may be generally cylindrical, and the mechanical member may act to stretch the sealing member axially such that it undergoes radial shrinkage to engage the supply line. The invention will however be described primarily in terms of duct seals, where most benefit is envisaged.

In the case of the preferred duct seal mentioned above, the deformation from the first configuration to the second configuration will comprise a radial expansion of a generally hollow portion of the duct seal. Thus, before deformation that portion will be easily insertable into the duct, and after deformation it will sealingly engage an internal surface of the duct. A sealing material such as a sealant (for example a mastic) or an adhesive (for example a hot-melt or other heat-activatable adhesive) may be provided between the duct and the surface of the duct seal that is to engage the duct. Such sealing material may conveniently be supplied coated or otherwise affixed to the relevant surface of the duct seal.

It is because it is desirable that this sealing material is not under significant peel or sheer forces in the installed product that the polymeric material should be substantially unstressed after deformation.

By substantially unstressed we therefore mean that if any stresses remain, the net force tending to displace the article from the substrate is not significant compared to the peel and/or sheer strength o any bond between the article and the substrate. Where no bond is provided, the force exerted by the mechanical member must significantly exceed any stresses in the article which would otherwise displace it from the substrate.

The mechanical member is preferably one or more springs that causes or allows a radial expansion of the part of the sealing member that is to engage the duct or other substrate. The important point here is that the mechanical member may be made to change from a configuration corresponding to that of the sealing member before installation (for example a portion of a duct seal of smaller diameter) to a configuration corresponding to that of the installed sealing member (for example enlarged diameter). Although this change may be aided by heat, it must not be brought about immediately solely by heat. Thus, the article may be heated away from the duct or other place where it is to be installed without the configurational change occurring that would make it difficult or impossible to install. The heating is desirable, however, to soften the material to allow easy deformation once in position and/or to activate any sealing material that may be used. The article is therefore first heated, secondly placed in position, and thirdly the mechanical member is operated either to allow or to cause the configurational change. In a preferred embodiment, the mechanical member will have at least two rest or stable positions corresponding to the first and second configurations of the sealing member, one of which will cause the desired resiliently biased engagement between the polymeric material and the substrate. This bias need not result from resilience in the mechanical device, but could result from resilience in the polymeric material or in the substrate or two or more of these possibilities.

Where operation of the mechanical member allows rather than causes the change in configuration, this may result from the polymeric material being dimensionally recoverable, generally expandable and the device initially acting as a hold-out.

The mechanical member may be an integral part of the article in the sense that it is part of the same structure as the polymeric material, or it may be mechanically affixed or bonded thereto, or it may be separate from the polymeric material and optionally provided as a re-useable tool.

Operation of the mechanical member may be by hand, for example by means of a lever which protrudes to the outside of the article. Other mechanisms, however, may be employed for example an electrical release or a mechanism triggered by heat. In this third case melting or softening of a fusible or softenable material could allow a resiliently deformed member to relax. Thus, the article would be heated to soften the sealing member or to activate an adhesive, then positioned in a duct etc, and then an accessible part further heated to trigger the fusible or softenable release. In a modification of this technique, a single heating step could provide the softening or adhesive activation and also activate the trigger; in this case, however, release that causes alteration of the mechanical member would be delayed in order that the article could be inserted into the duct etc.

BRIEF DESCRIPTION OF THE DRAWINGS

The invention is further illustrated by the accompanying drawings, in which.

PRIOR ART

Figure 1:
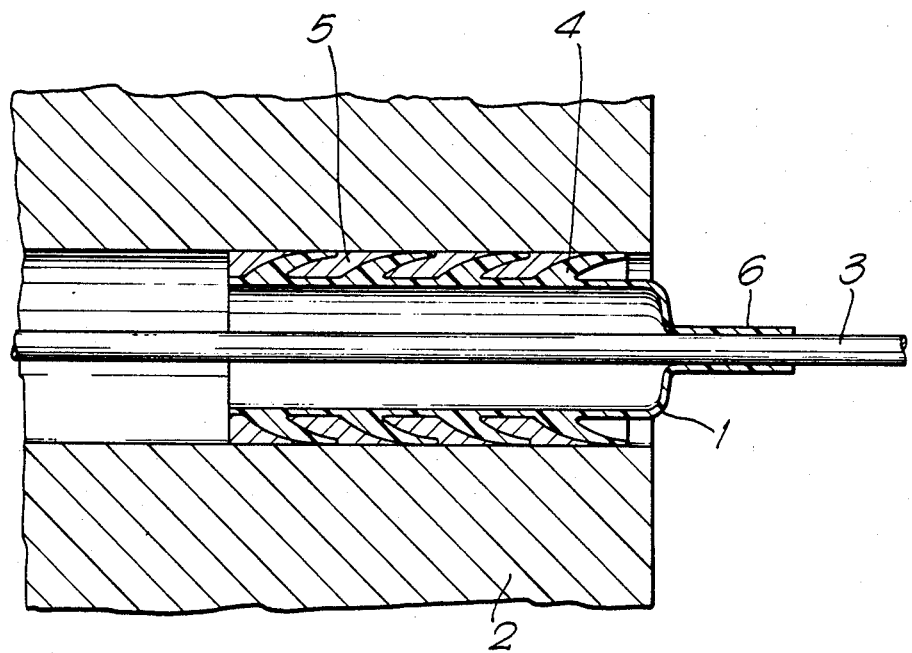
FIG. 1 shows a prior art duct seal.

The prior art duct seal 1 is shown installed in a duct 2, providing a seal between the duct 2 and a supply line 3. The duct seal 1 has flanges 4 which are deformable by heat, and a sealant 5 is shown enhancing the seal. The duct seal is heated and then pushed into the duct, deformation of the flanges being made possible by the heating step. After insertion into the duct the end 6 of the duct seal is heat-shrunk into engagement with the supply line 3. One can see that a change of configuration of the duct seal is not made once the duct seal is in position. It therefore must be made over size, which under unfavourable conditions may make installation difficult.

One can also see from FIG. 1 that heating of the part of the duct seal that is to engage the duct is almost impossible by conventional means after proper positioning of the seal.

DETAILED DESCRIPTION OF THE INVENTION

Figure 2:
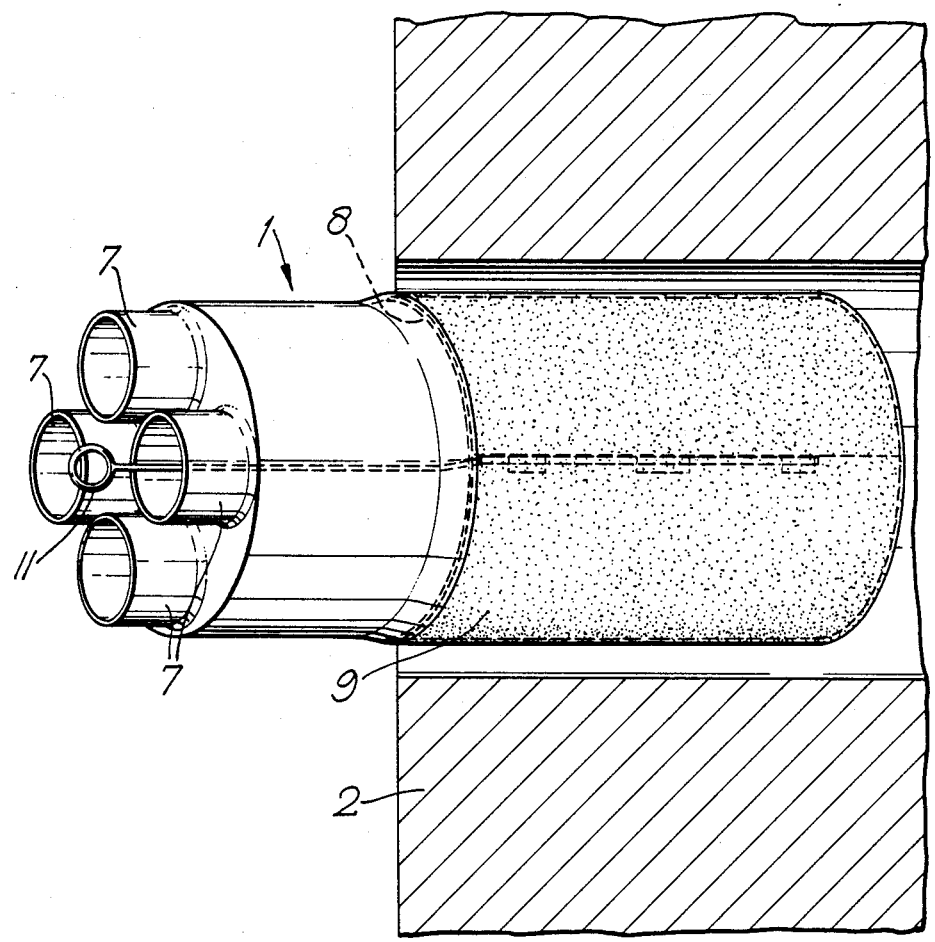
FIG. 2 shows a first embodiment according to the invention.

A duct seal 1 of the invention is shown in FIG. 2, positioned within a steel, PVC or other duct 2, but in its first configuration, i.e. before the expansion which causes its engagement with the duct. The seal is shown having four outlets 7, but more or less could be provided. A spring of any suitable material (for example resilient plastics, steel or beryllium-copper) is shown as an example of a mechanical member 8. Also shown is an adhesive coating 9. The spring causes expansion of the part of the duct seal that is inside the duct, on movement of the lever 10, for example pulling. The lever is shown passing though one of the outlets 7, but it could pass through a hole provided specially for that purpose. In general, the presence of lever 11 in an outlet will not result in a leak path between that outlet and a supply line therein particularly if a sealing material is used. However, in some circumstances it may be desirable that the lever 11 be disengageable from the mechanical member 8 housed within the body of the duct seal. Thus, the mechanical member may be operated remotely. The extent of expansion required to be brought about by the spring is not critical, although we prefer that it be small since the smaller the expansion, the smaller the force required. The expansion required may be particularly small if a duct seal is to be produced specific to each size of duct. We prefer that the diameter of the duct seal is increased by the spring by less than 25%, more preferably less than 10%, especially less than 5% particularly less than 3%.

Figure 3:
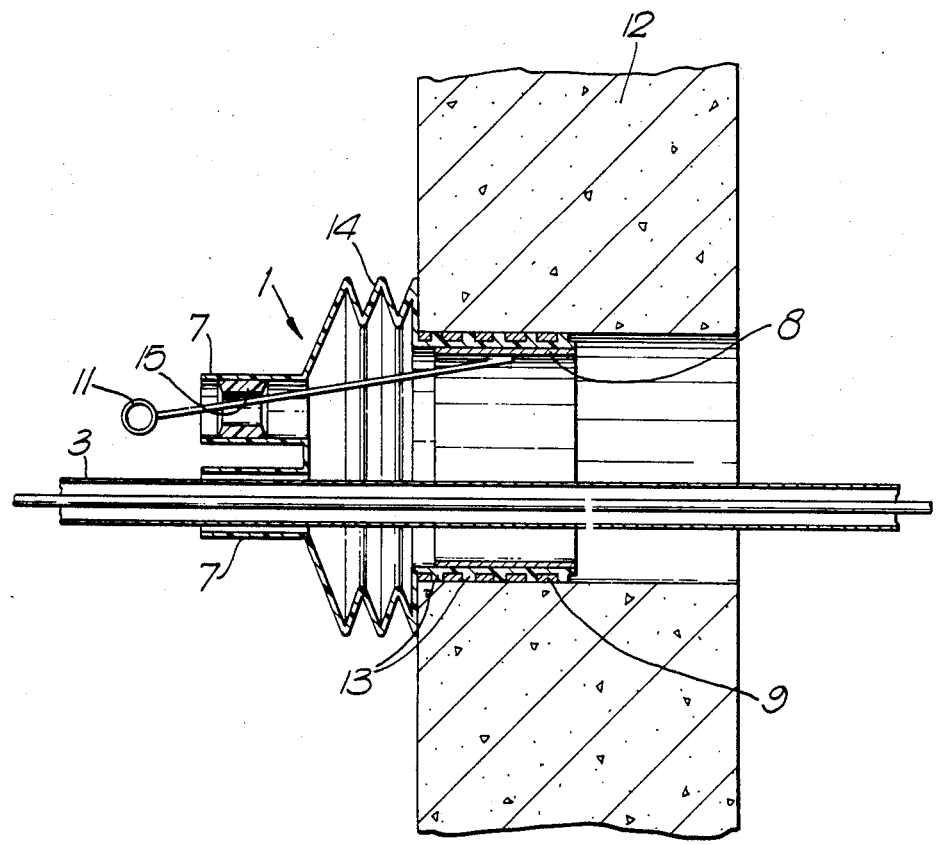
FIG. 3 shows a second embodiment according to the invention.

FIG. 3 shows some further features which may be used alone or together with those already mentioned.

Here the duct seal 1 is shown in the wall 12 of a man-hole. The seal is shown with two outlets 7, one of which carries a supply line, which in this case is an inner duct. The inner duct will itself carry a supply line such as a cable or a pipe. Thus, the duct seal shown provides a break-out from one large duct to a plurality of smaller ducts.

The duct seal is provided with ridges 13 which may be moulded as part of seal that is to engage the man-hole 12. Convolutions 14 are provided between the outlets 7 and the part of the seal that engages the man-hole 12. The purpose of convolutions 15 is to allow movement such as vibration or other axial or angular movement to occur in the supply line 3 without transmission to the seal 5.

One of outlets 7 is shown with a sealing lip 15 which may provide a seal to the supply line 3 by means of a simple interference fit. The lip may be integral with the outlet or an additional piece of sealing material etc. Instead of or additional to the lip, an end portion of the outlet 7 may be recoverable, or a closure device such as a hose-type clamp may be provided.

The duct seal may be provided with self-contained, for example electrical, heating means for heating the outlet 7 and/or the part which engages the duct in order to cause softening, to cause heat recovery and/or to cause activation of a sealing material. For heating the part of the seal that is to engage the duct, an electrical heating means may be provided as part of the spring or other mechanical member 8. For example, the spring may act as an electrical heater. The heating means may be self-regulating with respect to temperature, for example by incorporating a conductive polymeric or other material having a positive temperature coefficient of resistance as part of an electrical heating circuit.

The duct seal 1 could be constructed from a material which is deformable in the absence of heat, such as an elastomer, but preferred materials are polyolefins for example polyethylene.

Figure 4A:
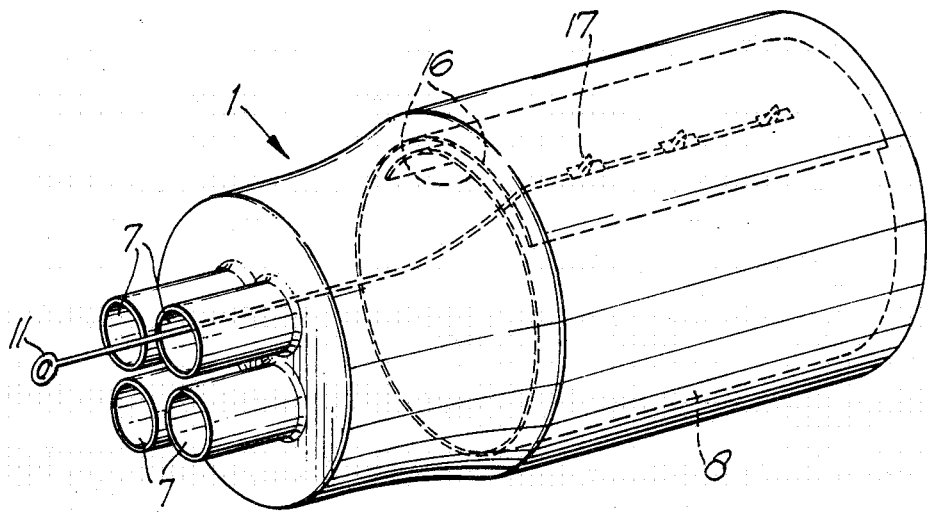
FIG. 4 shows a preferred design of the mechanical member.
Figure 4B:
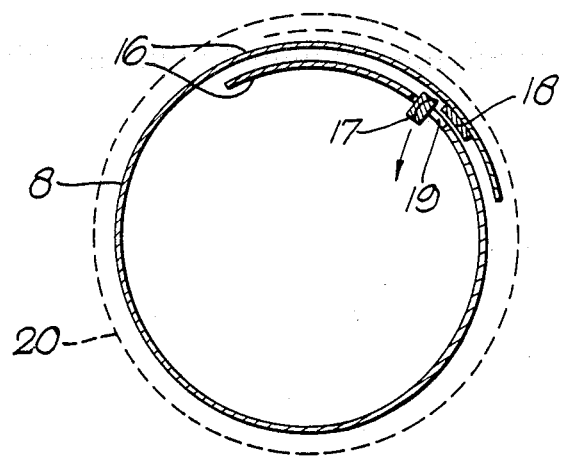

The duct seal 1 shown in FIG. 4a has a mechanical member 8 in the form of a wrapped sheet of sprung metal or other material. The edges 16 of member 8 overlap. The member may be held in a deformed configuration such as a cylinder of smaller diameter, i.e. of tighter wrap with a greater overlap of edges 16. A release member 17 is provided to let member 8 spring back to its configuration of larger diameter, thereby expanding the duct seal 1. For example, slots may be provided in the underlying edge 16 through which protrude elements which temporarily retain the overlying edge 16, which elements are displaceable or deformable by lever 11. FIG. 4b shows a transverse cross-section through the member 8 of the duct seal of FIG. 4a from which a detent mechanism comprising a protrusion 18 and slot 19 can be seen. On activation of the release member 17 the spring member 8 adopts the configuration shown by the dotted line 20. The mechanism 17 instead of allowing member 8 to relax, could positively deform member 8 for example by forcing edges 16 radially apart or by decreasing the extent of their overlap.

We claim:

1. A duct seal comprising:
    a sealing member that can be positioned within a duct to provide a seal between the duct and a substrate carried by the duct, and which can be radially expanded from a first configuration to a second configuration when heated but is not expanded immediately solely by heating, and when thus expanded to the second configuration is substantially unstressed and engages the duct; and
    a spring positioned within the sealing member and held in a resiliently biased configuration that corresponds to said first configuration, the bias of the spring being releasable after positioning of the sealing member in the duct to cause radial expansion of the heated sealing member, release of the bias not being brought about immediately solely by heating the sealing member, said release being caused by release means which is associated with said spring and which is not a part of said sealing member, said release means unlocking said spring from said resiliently biased configuration so that the heated sealing member can expand toward said second configuration.

* * * * *